(12) United States Patent
Park et al.

(10) Patent No.: US 11,765,735 B2
(45) Date of Patent: *Sep. 19, 2023

(54) METHOD AND DEVICE FOR TRANSMITTING OR RECEIVING DATA IN NEXT GENERATION WIRELESS ACCESS NETWORK

(71) Applicant: KT CORPORATION, Gyeonggi-do (KR)

(72) Inventors: Kyujin Park, Seoul (KR); Woo-jin Choi, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/307,945

(22) Filed: May 4, 2021

(65) Prior Publication Data

US 2021/0259007 A1 Aug. 19, 2021

Related U.S. Application Data

(63) Continuation of application No. 16/318,466, filed as application No. PCT/KR2017/008944 on Aug. 17, 2017, now Pat. No. 11,044,743.

(30) Foreign Application Priority Data

Sep. 1, 2016 (KR) .................. 10-2016-0112748
May 12, 2017 (KR) .................. 10-2017-0059543

(51) Int. Cl.
| | | |
|---|---|---|
| *H04W 72/23* | (2023.01) | |
| *H04L 5/00* | (2006.01) | |
| *H04W 72/1273* | (2023.01) | |

(52) U.S. Cl.
CPC .......... *H04W 72/23* (2023.01); *H04L 5/0037* (2013.01); *H04L 5/0044* (2013.01); *H04L 5/0094* (2013.01); *H04W 72/1273* (2013.01)

(58) Field of Classification Search
CPC ... H04L 5/0037; H04L 5/0044; H04L 5/0094; H04W 72/042; H04W 72/1273; H04W 72/1289

See application file for complete search history.

(56) References Cited

U.S. PATENT DOCUMENTS 7,680,094 B2 * 3/2010 Liu .................. H04J 3/0682
370/503
8,161,210 B1 * 4/2012 Norrie .................. H04L 25/14
710/33

(Continued)

OTHER PUBLICATIONS

U.S. Appl. No. 62/368,369, (filed 2016).*

(Continued)

*Primary Examiner* — Dung B Huynh
(74) *Attorney, Agent, or Firm* — INSIGHT LAW GROUP, PLLC; Seung Lee

(57) ABSTRACT

Provided is a method for designing downlink control channel for satisfying requirement of the different usage scenarios from each other in a next-generation/5G radio access network which has been discussed in the 3rd generation partnership project (3GPP). In particular, a method of a base station may be provided for transmitting/receiving data in a next-generation radio access network. The method may include configuring a time domain scheduling unit made up of at least one OFDM symbol for each user equipment, allocating a downlink data channel transmission resource with the time domain scheduling unit for a first user equipment, and puncturing a part of the downlink data channel transmission resource for the first user equipment and allocating the punctured resource to the downlink data channel transmission resource for a second user equipment.

15 Claims, 7 Drawing Sheets

(56) References Cited

U.S. PATENT DOCUMENTS

| | | | |
|---|---|---|---|
| 10,531,467 B2 | 1/2020 | Lin | |
| 10,798,698 B2* | 10/2020 | Seo | H04L 5/1469 |
| 11,224,017 B2* | 1/2022 | Marinier | H04L 5/001 |
| 2008/0095195 A1 | 4/2008 | Ahmadi | |
| 2008/0291883 A1* | 11/2008 | Seok | H04W 64/00 370/338 |
| 2009/0092103 A1* | 4/2009 | Rao | H04L 1/1887 370/336 |
| 2010/0040005 A1* | 2/2010 | Kim | H04W 72/1284 370/329 |
| 2010/0278083 A1 | 11/2010 | Kwak | |
| 2011/0032855 A1* | 2/2011 | Kim | H04L 5/0037 370/294 |
| 2012/0014306 A1* | 1/2012 | Pelletier | H04W 52/0216 370/311 |
| 2012/0044857 A1* | 2/2012 | Kim | H04B 7/2606 370/315 |
| 2012/0113904 A1 | 5/2012 | Anderson | |
| 2012/0182946 A1 | 7/2012 | Chen | |
| 2012/0230272 A1* | 9/2012 | Kim | H04L 5/0055 370/329 |
| 2013/0003672 A1 | 1/2013 | Dinan | |
| 2013/0242904 A1 | 9/2013 | Sartori | |
| 2013/0301515 A1* | 11/2013 | Kim | H04L 1/1864 370/312 |
| 2014/0126517 A1* | 5/2014 | Choi | H04L 5/0053 370/329 |
| 2015/0264683 A1 | 9/2015 | Kim | |
| 2015/0288548 A1* | 10/2015 | Allmendinger | H04L 43/50 370/252 |
| 2015/0334685 A1 | 11/2015 | Ji et al. | |
| 2015/0334709 A1* | 11/2015 | Ji | H04W 72/1231 370/330 |
| 2015/0334729 A1 | 11/2015 | Ji et al. | |
| 2016/0036581 A1* | 2/2016 | Yerramalli | H04L 27/2607 370/280 |
| 2016/0113008 A1* | 4/2016 | Damnjanovic | H04W 72/14 370/336 |
| 2016/0128095 A1* | 5/2016 | Damnjanovic | H04L 1/1887 370/336 |
| 2016/0197717 A1 | 7/2016 | Zhang | |
| 2016/0278117 A1* | 9/2016 | Sahlin | H04W 72/14 |
| 2016/0309464 A1 | 10/2016 | Mukherjee | |
| 2016/0345206 A1* | 11/2016 | Yerramalli | H04L 5/0048 |
| 2016/0352551 A1 | 12/2016 | Zhang | |
| 2016/0353443 A1 | 12/2016 | Desai | |
| 2017/0012753 A1* | 1/2017 | Kim | H04W 56/002 |
| 2017/0156140 A1 | 6/2017 | Islam | |
| 2017/0201968 A1 | 7/2017 | Nam | |
| 2017/0202028 A1* | 7/2017 | Gaal | H04W 74/0833 |
| 2017/0215170 A1 | 7/2017 | Islam | |
| 2017/0257860 A1 | 9/2017 | Nam | |
| 2017/0290004 A1 | 10/2017 | Yang | |
| 2017/0295592 A1 | 10/2017 | Yang | |
| 2017/0310431 A1 | 10/2017 | Iyer | |
| 2017/0311315 A1 | 10/2017 | Islam | |
| 2017/0325250 A1 | 11/2017 | Manolakos | |
| 2017/0325256 A1 | 11/2017 | Islam | |
| 2017/0331606 A1* | 11/2017 | Chen | H04L 27/0006 |
| 2017/0332359 A1 | 11/2017 | Tsai | |
| 2017/0347353 A1* | 11/2017 | Yerramalli | H04W 72/0413 |
| 2017/0359807 A1 | 12/2017 | Hong | |
| 2017/0367110 A1 | 12/2017 | Li | |
| 2018/0007673 A1 | 1/2018 | Fwu | |
| 2018/0027493 A1* | 1/2018 | Li | H04L 5/14 370/280 |
| 2018/0027576 A1 | 1/2018 | Kowalski | |
| 2018/0035332 A1* | 2/2018 | Agiwal | H04W 28/16 |
| 2018/0035416 A1 | 2/2018 | Yi | |
| 2018/0035458 A1 | 2/2018 | Islam | |
| 2018/0035459 A1* | 2/2018 | Islam | H04L 5/0053 |
| 2018/0041858 A1 | 2/2018 | Sheng | |
| 2018/0049166 A1 | 2/2018 | Sun | |
| 2018/0049169 A1 | 2/2018 | Lin | |
| 2018/0049189 A1 | 2/2018 | Hugl | |
| 2018/0063749 A1* | 3/2018 | Islam | H04L 5/0053 |
| 2018/0063865 A1* | 3/2018 | Islam | H04L 5/0091 |
| 2018/0076924 A1* | 3/2018 | Lee | H04W 72/042 |
| 2018/0083758 A1 | 3/2018 | Islam | |
| 2018/0212732 A1 | 7/2018 | You | |
| 2018/0227897 A1* | 8/2018 | Yeo | H04J 11/0076 |
| 2018/0279388 A1 | 9/2018 | Miao | |
| 2018/0295591 A1* | 10/2018 | Eyuboglu | H04W 56/001 |
| 2018/0309546 A1* | 10/2018 | Tang | H04L 1/1896 |
| 2018/0359772 A1* | 12/2018 | Park | H04W 72/1268 |
| 2018/0368110 A1 | 12/2018 | Ying | |
| 2019/0007152 A1 | 1/2019 | Yi | |
| 2019/0037562 A1 | 1/2019 | Park | |
| 2019/0059066 A1* | 2/2019 | Harmatos | H04J 3/0673 |
| 2019/0082433 A1 | 3/2019 | Tang | |
| 2019/0098608 A1 | 3/2019 | Yi | |
| 2019/0098648 A1 | 3/2019 | Liu | |
| 2019/0104551 A1 | 4/2019 | Deenoo | |
| 2019/0116007 A1 | 4/2019 | Yi | |
| 2019/0116582 A1 | 4/2019 | Pelletier | |
| 2019/0132838 A1 | 5/2019 | Yi | |
| 2019/0159178 A1 | 5/2019 | Tang | |
| 2019/0159191 A1* | 5/2019 | Kim | H04W 76/27 |
| 2019/0165906 A1* | 5/2019 | Bala | H04L 27/3488 |
| 2019/0190687 A1 | 6/2019 | Yi | |
| 2019/0191429 A1 | 6/2019 | Stern-Berkowitz | |
| 2019/0200347 A1* | 6/2019 | Ryu | H04W 72/0413 |
| 2019/0215133 A1 | 7/2019 | Pan | |
| 2019/0281609 A1 | 9/2019 | Kowalski | |
| 2019/0297602 A1 | 9/2019 | You | |
| 2019/0335495 A1 | 10/2019 | Yi | |
| 2020/0015247 A1 | 1/2020 | Ji et al. | |
| 2020/0015248 A1 | 1/2020 | Ji et al. | |
| 2020/0077470 A1 | 3/2020 | Xiong | |
| 2020/0195386 A1 | 6/2020 | Marinier | |

OTHER PUBLICATIONS

U.S. Appl. No. 62/304,708, filed 2016.
U.S. Appl. No. 62/306,415, filed 2016.
U.S. Appl. No. 62/333,397, filed 2016.
U.S. Appl. No. 62/379,559, filed 2016.
Nokia et aL, "Punctured Scheduling for Low Latency Transmissions", R1-167308, 3GPP TSG-RAN WG1 #86, Gothenburg, Sweden, Aug. 22-26, 2016.
European Patent Office, European Search Report of corresponding EP Patent Application No. 17846885.6, dated Dec. 18, 2019.
Nokia et al., "Punctured Scheduling for Low Latency Transmissions", R1-165381, 3GPP TSG-RAN WG1 #85, Nanjing, PR China, May 23-27, 2016, 2016, pp. 1-4.
NTT DOCOMO, Inc., "On co-existence of eMBB and URLLC", R1-167391, 3GPP TSG RAN WG1 Meeting #86, Gothenburg, Sweden Aug. 22-26, 2016, pp. 1-5.
Sharp et al., "Channel coding schemes for eMBB and URLLC Coexistence", R1-167617, 3GPP TSG RAN WG1 Meeting #86, Gothenburg, Sweden, Aug. 22-26, 2016, pp. 1-10.
LG Electronics et al., WF on Supporting URLLC in NR, R1-168550, 3GPP TSG RAN WG1 Meeting #86, Gothenburg, Sweden, Aug. 22-26, 2016, pp. 1-2.
ETRI: "Discussion on numerology for NR", 3GPP Draft; R1-164870, 3rd Generation Partnership Project (3GPP), Mobile Competence Centre.
European Patent Office, European Office Action of corresponding EP Patent Application No. 17846885.6, dated Jun. 18, 2021.

\* cited by examiner

METHOD AND DEVICE FOR TRANSMITTING OR RECEIVING DATA IN NEXT GENERATION WIRELESS ACCESS NETWORK

CROSS-REFERENCE TO RELATED APPLICATIONS

This application is a continuation of application Ser. No. 16/318,466, filed on Jan. 17, 2019, now U.S. Pat. No. 11,044,743, which is a National Stage Patent Application of PCT International Patent Application No. PCT/KR2017/008944, filed on Aug. 17, 2017 under 35 U.S.C. § 371, which claims priorities to Korean Patent Application Nos. 10-2017-0059543, filed on May 12, 2017 and 10-2016-0112748, filed on Sep. 1, 2016, the teachings of which are incorporated herein in their entireties by reference.

TECHNICAL FIELD

The present disclosure relates to operation of a user equipment and a base station for transmitting/receiving data in a next-generation/5G radio access network (hereinafter, referred to as a new radio (NR)) which has been discussed in the 3rd generation partnership project (3GPP).

BACKGROUND ART

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for a new radio (NR).

It is required to design the NR not only to provide an improved data transmission rate as compared with the long term evolution (LTE), but also to meet various requirements in detailed and specific usage scenarios.

An enhanced mobile broadband (eMBB), a massive machine-type communication (mMTC), and an ultra-reliable and low latency communication (URLLC) are proposed as representative usage scenarios of the NR. In order to meet the requirements of the individual scenarios, it is required to design NR to have flexible frame structures, compared with the LTE.

As a method for satisfying these various usage scenarios, a method for supporting scheduling units having different lengths in the time domain is being discussed.

In order to satisfy the URLLC requirement, the scheduling unit in the time domain needs to be subdivided. However, in terms of the eMBB, an overly subdivided scheduling unit has an undesirable problem in terms of cell throughput accompanied with excessive control overhead. Also, in terms of the mMTC, a slightly longer time domain resource allocation scheme may be appropriate for coverage enhancement.

Therefore, there is required a resource allocation method capable of satisfying each requirement for various usage scenarios.

DETAILED DESCRIPTION OF THE INVENTION

Technical Problem

It is an object of the present disclosure to provide a resource allocation method for satisfying the requirement of a usage scenario such as the URLLC in a long time domain resource allocation structure such as the eMBB or the mMTC in a next-generation/5G radio access network.

Technical Solution

An aspect of the present disclosure is to provide a method of transmitting/receiving data by a base station in a next-generation radio access network, the method including configuring a time domain scheduling unit composed of OFDM symbols for each user equipment, allocating a downlink data channel transmission resource with the time domain scheduling unit for a first user equipment, and puncturing a part of the downlink data channel transmission resource for the first user equipment and allocating the punctured resource to the downlink data channel transmission resource for a second user equipment.

Another aspect of the present disclosure is to provide a method of transmitting/receiving data by a user equipment in a next-generation radio access network, the method including transmitting/receiving the data through an allocated resource with a time domain scheduling configured for each user equipment from a base station, receiving a pre-emption indication information indicating a punctured resource within the time domain scheduling unit including the allocated resource, and stopping transmitting/receiving the data according to the pre-emption indication information.

Further another aspect of the present disclosure is to provide a base station transmitting/receiving data in a next-generation radio access network, the method including a controller configured to configure a time domain scheduling unit composed of an OFDM symbol for each user equipment, allocate a downlink data channel transmission resource with the time domain scheduling unit for a first user equipment and puncture a part of the downlink data channel transmission resource for the first user equipment to allocate the punctured resource to the downlink data channel transmission resource for a second user equipment, and a transmitter configured to transmit a downlink data channel according to the allocated downlink data channel transmission resource.

Yet another aspect of the present disclosure is to provide a user equipment transmitting/receiving data in a next-generation radio access network, the method including a receiver configured to receive the data through an allocated resource with a time domain scheduling configured for each user equipment from a base station and receive a pre-emption indication information indicating a punctured resource within the time domain scheduling unit including the allocated resource from a base station, and a controller configured to stop transmitting/receiving the data according to the pre-emption indication information.

Effects of the Invention

In accordance with embodiments of the present disclosure, a resource allocation method is provided for a usage scenario that requires a detailed resource allocation structure in a long time domain resource allocation structure. Accordingly, various usage scenarios may be satisfied in a next-generation/5G radio access network.

MODE FOR CARRYING OUT THE INVENTION

Figure 1:
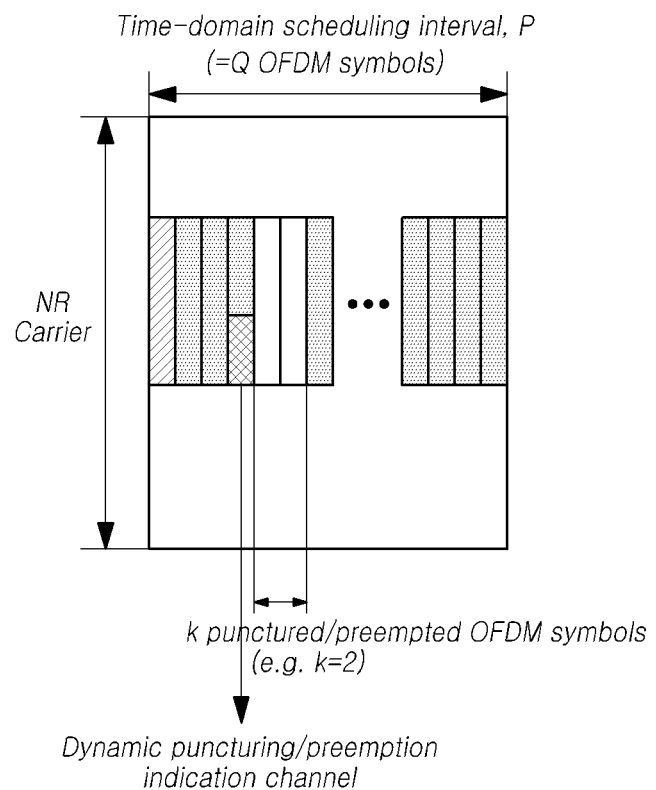
FIGS. 1 to 3 are diagrams illustrating exemplary puncturing indication channels (or a preemption indication signal) in a method of transmitting and receiving data in a next generation radio access network according to embodiments.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a machine type communication (MTC) device may refer to a device supporting low cost (or low complexity), a device supporting coverage enhancement, or the like. The MTC device may refer to a device that supports low cost (or low complexity) and coverage enhancement, or the like. The MTC device may refer to a device defined in a predetermined category for supporting low cost (or low complexity) and/or coverage enhancement.

In other words, the MTC device may refer to a low cost (or low complexity) user equipment (UE) category/type newly defined in 3GPP Release-13 and performing LTE-based MTC-related operations. As another example, the MTC device may refer to a UE category/type defined in or before 3GPP Release-12, which supports enhanced coverage in comparison with the typical LTE coverage or supports low power consumption, or may refer to a low cost (or low complexity) UE category/type newly defined in Release-13.

A wireless communication system is widely installed to provide various communication services, such as a voice communication service, a packet data service, etc. The wireless communication system includes a user equipment (UE) and a base station (BS, or eNB). The UE is defined as a generic term including terminals used in wireless communication, and therefore includes as well as UEs in wideband code division multiple access (WCDMA), long term evolution (LTE), high speed packet access (HSPA), and the like, a mobile station (MS) in global systems for mobile communication (GSM), a user terminal (UT), a subscriber station (SS), a wireless device, or the like.

The BS or a cell generally refers to a station communicating with the UE. The BS or cell may be referred to as a Node-B, an evolved Node-B (eNB), a sector, a site, a base transceiver system (BTS), an access point, a relay node, a remote radio head (RRH), a radio unit (RU), a small cell, or the like.

In the present disclosure, the BS or cell is defined as a generic term denoting i) base stations, such as a base station controller (BSC) in CDMA, a Node-B in the WCDMA, an evolved Node-B (eNB) or a sector (site) in the LTE, and the like, and ii) coverage areas or functions covered by the base station, such as a megacell, a macrocell, a microcell, a picocell, a femtocell and small cell communication range of a relay node, a RRH, and a RU.

Since each of the above-described various cells is controlled by a BS, therefore the BS may be classified into two categories. The BS may be referred to i) an apparatus that provides a megacell, a macrocell, a microcell, a picocell, a femtocell, or a small cell, in association with a radio area, or ii) the radio area itself. In i), the BS may be referred to a) apparatuses that form a corresponding radio area and are controlled by the same entity or b) apparatus interact and cooperate to each other to configure a corresponding radio area. According to a method of establishing a radio area, the BS may be referred to as an eNB, a RRH, an antenna, a RU, a low power node (LPN), a point, a transmission/reception point, a transmission point, a reception point, or the like. In ii), the BS may be a radio area itself for receiving or transmitting a signal from UE perspective or neighboring BS perspective.

Accordingly, the megacell, the macrocell, the microcell, the picocell, the femtocell, or the small cell, the RRH, the antenna, the RU, the LPN, the point, the eNB, the transmission/reception point, the transmission point, or the reception point are collectively referred to as the BS.

In the present disclosure, the UE and the BS are two entities for performing transmission/reception used to embody the technology and technical spirit described in the present specification. The UE and the BS are defined as a generic term and not limited to specific terms or words. The UE and the BS are two entities for performing transmission/reception through uplink or downlink used to embody the technology and technical spirit described in the present disclosure. The UE and the BS are defined as a generic term and not limited to specific terms or words. The uplink (UL) refers to a scheme transmitting/receiving data by a UE to/from a BS, and the downlink (DL) refers to a scheme transmitting/receiving data by a BS to/from a UE.

Any of multiple access techniques may be applied to the wireless communication system. Various multiple access techniques may include code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. At least one embodiment of the present disclosure may be applied to resource allocation in as well as asynchronous wireless communication evolving into LTE/LTE-advanced and IMT-2020 beyond GSM, WCDMA, and HSPA, synchronous wireless communication evolving into CDMA, CDMA-2000, and UMB. The present disclosure is not limited to or shall not be construed to be limited to a particular wireless communication field, and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, in some systems such as the LTE or LTE-advanced, a related standard defines that the UL and the DL are configured based on a single carrier or a pair of carriers. The UL and the DL may transmit control information through control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. Furthermore, the UL and the DL may transmit data through data channels, such as a physical DL shared channel (PDSCH), a physical UL shared channel (PUSCH), or the like.

Meanwhile, control information may be transmitted through an enhanced PDCCH (EPDCCH) or extended PDCCH (EPDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

In some embodiments, a wireless communication system may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be at least one RRH that is connected to a BS or macrocell (hereinafter, referred to as 'eNB') through an optical cable or an optical fiber and thereby controlled in a wired manner, and that has high transmission power or low transmission power in a macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points and a receiver may be a part of the UE. In the UL, a transmitter may be a part of the UE and a receiver may be a part of multiple transmission/reception points.

Hereinafter, "a signal is transmitted/received through a channel, such as PUCCH, PUSCH, PDCCH, EPDCCH, PDSCH or the like" may be referred to as "a channel such as PUCCH, PUSCH, PDCCH, EPDCCH or PDSCH is transmitted or received."

In addition, hereinafter, a description of transmitting or receiving a PDCCH or a description of transmitting or receiving a signal through the PDCCH may have the same meaning including transmitting or receiving an EPDCCH or transmitting or receiving a signal through the EPDCCH.

That is, a physical DL control channel described below may denote a PDCCH or an EPDCCH, or is also used as meaning including both the PDCCH and the EPDCCH.

Also, for convenience of description, an EPDCCH may be applied to an embodiment described with the PDCCH, as an embodiment of the present disclosure, and the PDCCH may be also applied to an embodiment described with the EPDCCH as an embodiment.

Meanwhile, higher layer signaling described below contains radio resource control (RRC) signaling transmitting RRC information containing an RRC parameter.

The eNB performs DL transmission to UEs. The eNB may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmission/reception of a signal through each channel will be described as transmission/reception of the corresponding channel.

NR (New Radio)

Recently, the 3GPP has approved the "Study on New Radio Access Technology", which is a study item for research on next-generation/5G radio access technology. On the basis of such a study item, the 3GPP have started discussions about frame structure, channel coding & modulation, waveform, multiple access scheme, etc.

It is required to design the NR not only to provide an enhanced data transmission rate as compared with that of LTE/LTE-Advanced, but also to meet various requirements for detailed and specific usage scenarios.

In particular, the eMBB, the mMTC, and the URLLC have been discussed as representative usage scenarios of the NR, and it has been required to design more flexible frame structures as compared with those for LTE/LTE-Advanced in order to meet the requirements of each usage scenario.

Specifically, the eMBB, the mMTC, the URLLC are considered as representative usage scenarios of the NR. Since each usage scenario imposes a different requirement of data rates, latency, coverage, etc., many discussions have been conducted for a technique of efficiently multiplexing radio resource units based on different types of numerology (e.g., a subcarrier spacing (SCS), a subframe, a transmission time interval (TTI), etc.) in order to efficiently satisfy requirements of usage scenarios through a frequency band of any NR system.

For example, there is a need to support a structure of 1 ms subframe (or 0.5 ms slot) based on 15 kHz subcarrier spacing in the same way as the typical LTE, a structure of 0.5 ms subframe (or 0.25 ms slot) based on 30 kHz subcarrier spacing, and a structure of 0.25 ms subframe (0.125 ms slot) based on 60 kHz subcarrier spacing over a single NR frequency band.

There have been discussions on how to configure a subframe composed of X OFDM symbols (e.g., X=14 or 7, or any other natural number) or a slot made up of Y OFDM symbols (Y=14 or 7, or any other natural number), define mini-slots made up of Z OFDM symbols (s) (e.g., Any natural number satisfying Z<Y & Z<X), as a resource allocation unit in the time domain (i.e., a scheduling unit in the time domain) in any numerology (i.e., subcarrier spacing structure).

As described above, there have been discussions on a method for supporting various scheduling units each having a length different from the other in the time domain as a method for satisfying various usage scenarios in the NR.

In particular, in order to satisfy the URLLC requirement, it is necessary to subdivided the scheduling unit in the time domain.

From the eMBB perspective, however, an overly subdivided time domain scheduling unit is not desirable from a cell throughput point of view because of excessive control overhead. Also, in terms of the mMTC, a longer domain resource allocation scheme may be more suitable for coverage enhancement.

The present disclosure introduces a resource allocation method for satisfying the URLLC requirement even in a long time domain resource allocation structure such as the eMBB and the mMTC.

As described above, in order to support the URLLC service in the NR, it is necessary to support a short scheduling unit (or TTI (Transmission Time Interval)) that may satisfy the latency boundary in the time domain.

On the other hand, in the case of the eMBB or the mMTC, it is effective to apply the time domain resource allocation unit, which is slightly longer than the URLLC usage scenario, in terms of control overhead and cell coverage in defining the scheduling unit in the time domain.

In order to satisfy requirements of various NR usage scenarios simultaneously, it is necessary to support mixed numerology structure supporting the numerology of subcarrier spacing (e.g. larger subcarrier spacing such as 60 kHz, 120 kHa, etc.) which easily define a short time domain resource allocation unit suitable for the URLLC and the numerology of subcarrier spacing (15 kHz for eMBB or 3.75 kHz for the mMTC) suitable for the eMBB and the mMTC by a single NR carrier. It is also necessary to simultaneously support the time domain scheduling units with different lengths from each other, such as a subframe, a slot or a mini-slot, within the NR carrier operating in any one numerology.

As a method for satisfying the above requirements, it may i) semi-statically allocate time/frequency resources (or regions) based on the optimal scheduling unit for each usage scenario and ii) allocate resources using time/frequency resources of the corresponding region according to the usage scenarios for each user equipment.

However, such a semi-static method may reduce efficiency from the viewpoint of NR system. For example, it may not be desirable to dedicate a time/frequency resource that always supports a short time domain scheduling unit to satisfy the sparse URLLC service in any NR cell in which URLLC traffic occurs sparsely.

For solving this problem, a method may be provided for dynamically using a part of scheduling resources of eMBB or mMTC whenever a corresponding URLLC traffic is generated in order to satisfy the corresponding URLLC latency requirement in accordance with at least one embodiment.

For this method the present disclosure introduces a method for puncturing/pre-empting a part of already allocated data channel resource for the eMBB or the mMTC, and transmitting/receiving the URLLC traffic through the corresponding resource in accordance with at least one embodiment.

Definition of Dynamic "Puncturing Indication Channel/Pre-Emption Indication Signal"

Figure 2:
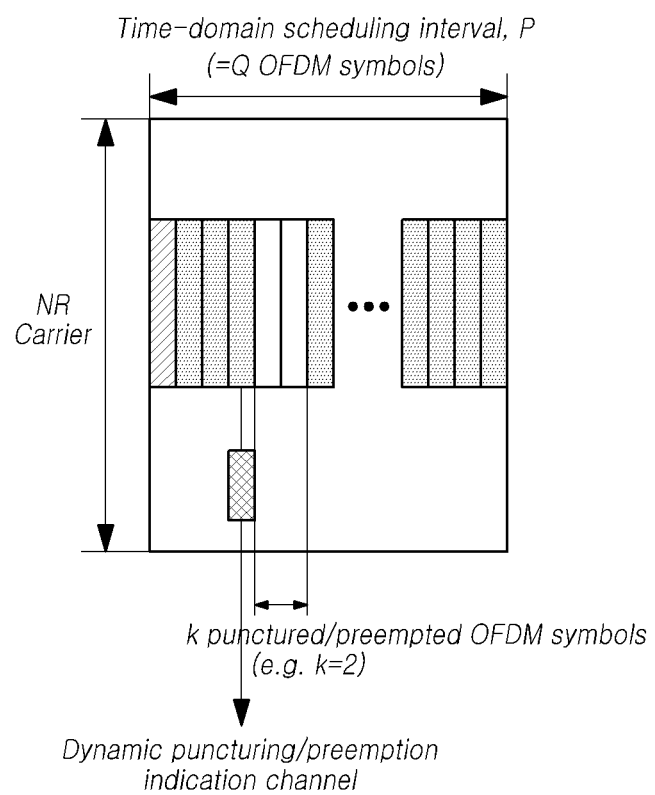
Figure 3:
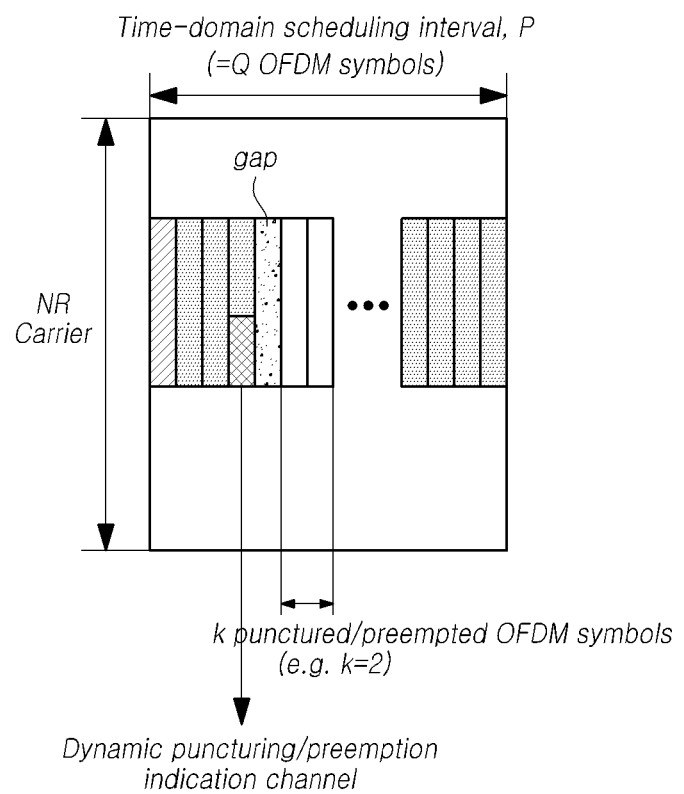

FIG. 1 to FIG. 3 are diagrams illustrating exemplary resource allocation schemes for transmitting and receiving data in order to satisfy various usage scenarios in in a next generation radio access network according to the present embodiments.

When one subframe made up of X OFDM symbols or one slot composed of Y OFDM symbols or mini-slot formed of Z OFDM symbols is configured as a scheduling unit in the time domain for the eMBB (or mMTC) in any NR carrier, or when a time domain scheduling unit for the eMBB (or mMTC) is constructed by concatenation of one or more subframes, slots or mini-slots in succession, transmission/reception of the downlink control channel including the scheduling information for the eMBB (or mMTC) user equipment may be performed in the scheduling unit of the corresponding time domain.

That is, when the length of the scheduling unit of the time domain for a downlink (or uplink) data channel of an arbitrary eMBB (or mMTC) user equipment is P as shown in FIG. 1, the user equipment may be defined to receive the scheduling control information transmitted from the base station with the minimum period of the P. Further, a downlink control channel for transmitting the corresponding scheduling control information may be defined based on the above mentioned scheme.

In this case, when the number of OFDM symbols forming the corresponding time domain scheduling interval P is Q, the corresponding Q value has one of values of X, Y, and Z, or multiple of X, Y, and Z according to the time domain scheduling unit configuration.

As described above, among the Q OFDM symbols forming the scheduling unit for the downlink data (or uplink data) defined for any eMBB (or mMTC) user equipment, the base station may use a part of time resource (i.e., any k OFDM symbol(s), k<Q) for urgent URLLC traffic transmission/reception. A method for enabling a base station to use k OFDM symbol (s) for the urgent URLLC traffic transmission/reception may be defined to support a dynamic puncturing/pre-emption indication that the base station may indicate puncturing/pre-emption of the transmission/reception of the downlink data (or uplink data) in any k OFDM symbols (s) among the Q OFDM symbols for any eMBB (or mMTC) user equipment.

As the detailed method, a dynamic puncturing indication channel/dynamic pre-emption indication signal is defined for indicating dynamic time resource puncturing/pre-emption within the corresponding scheduling time interval P. The base station may indicate, to the eMBB (or mMTC) user equipment, any k OFDM symbol (s) to be used for the ULLC traffic transmission/reception among the Q OFDM symbols allocated for downlink (or uplink) data transmission/reception of the corresponding eMBB (or mMTC) through the dynamic puncturing indication channel/dynamic pre-emption indication signal.

Specifically, as shown in FIG. 1, the base station may be defined to transmit the dynamic puncturing indication channel/dynamic pre-emption indication signal through any one or more OFDM symbols in the scheduling time interval P, and the eMBB (or mMTC) user equipment may be defined to puncture/pre-empt the downlink data reception (or uplink data transmission) in the k OFDM symbol(s) among the Q OFDM symbols allocated for its own data transmission/reception after receiving the dynamic puncturing indication channel/dynamic pre-emption indication signal.

That is, a NR user equipment may be defined to monitor the dynamic puncturing indication channel/dynamic pre-emption indication signal which is transmitted from the base station within the time domain scheduling unit at a constant period in the time domain scheduling interval, P, or the base station may be defined to configure the dynamic puncturing indication channel/dynamic pre-emption indication signal (through cell-specific, UE-specific RRC signaling, or DCI).

When a NR user equipment is allocated with resources for the downlink data (or uplink data) through a scheduling interval, P, and when the NR user equipment receives the dynamic puncturing indication channel/dynamic pre-emption indication signal in the corresponding scheduling interval, P, the NR user equipment may be defined to determine that the puncturing/pre-emption for the downlink data is performed at the k consecutive OFDM symbols after receiving the dynamic puncturing indication channel/dynamic pre-emption indication signal, or the NR user equipment may be defined to stop the uplink data transmission during the k consecutive OFDM symbols.

Unlike FIG. 1, in accordance with another embodiment, a gap may be added between i) the OFDM symbol(s) for transmitting and receiving the dynamic puncturing indication channel/dynamic pre-emption indication signal and ii) the k punctured or pre-empted OFDM symbol(s), as shown in FIG. 3.

A k value indicating the number of punctured or pre-empted OFDM symbols may be signaled through the corresponding dynamic puncturing indication channel/dynamic pre-emption indication signal. Furthermore, the k value indicating the number of punctured or pre-empted OFDM symbols may be i) semi-statically configured through cell-specific/UE specific RRC signaling, ii) defined using a function of a subcarrier spacing for the eMBB (or mMTC) user equipment and a subcarrier spacing for the URLLC, or iii) defined using a function of a size of the time domain scheduling unit for the eMBB (or mMTC) user equipment such as the value of P (or Q) and the length of the domain scheduling unit.

In addition, when a timing gap between the dynamic puncturing indication channel/dynamic pre-emption indication signal and the punctured/pre-empted k OFDM symbol (s) is defined as described above, the corresponding timing gap may be i) defined to have afixed value (e.g., 1 OFDM symbol) in consideration with a processing time of the user equipment, ii) transmitted via the corresponding dynamic puncturing indication channel/dynamic pre-emption indication signal, or iii) configured through cell-specific/UE-specific RRC signaling.

Additionally, the dynamic puncturing indication channel/dynamic pre-emption indication signal for a user equipment may be transmitted through the frequency resource allocated for downlink data transmission to the corresponding user equipment as shown in case a of FIG. 1 or the different frequency resource as shown in case b of FIG. 2.

If in-band transmission is supported, the data puncturing/pre-emption may be defined to be performed i) at all resources of the OFDM symbol (s) for transmitting the dynamic puncturing indication channel/dynamic pre-emption indication signal or ii) at resource elements (REs) for actually transmitting dynamic puncturing indication channel/dynamic pre-emption indication signal as shown in FIG. 1 and for transmitting data in the remaining RE, within the corresponding OFDM symbol(s).

In addition, the dynamic puncturing indication channel/dynamic pre-emption indication signal may be UE-specifically transmitted in order to perform the puncturing/pre-emption to UE-specifically. Furthermore, the dynamic puncturing indication channel/dynamic pre-emption indication signal may be cell-specifically transmitted in order to commonly apply the same puncturing/pre-emption to all scheduled user equipments in the scheduling interval.

In addition, in accordance with at least one embodiment a NR user equipment may be defied to perform data transmission/reception by rate matching through the remaining available resource except of the REs composed of the k OFDM symbols as well as the data puncturing/pre-emption mechanism for the k punctured/pre-empted OFDM symbol (s) according to the corresponding dynamic puncturing/pre-emption indication information within the scheduling interval, P (or Q OFDM symbols) allocated for the downlink data (or uplink data) transmission/reception.

Figure 4:
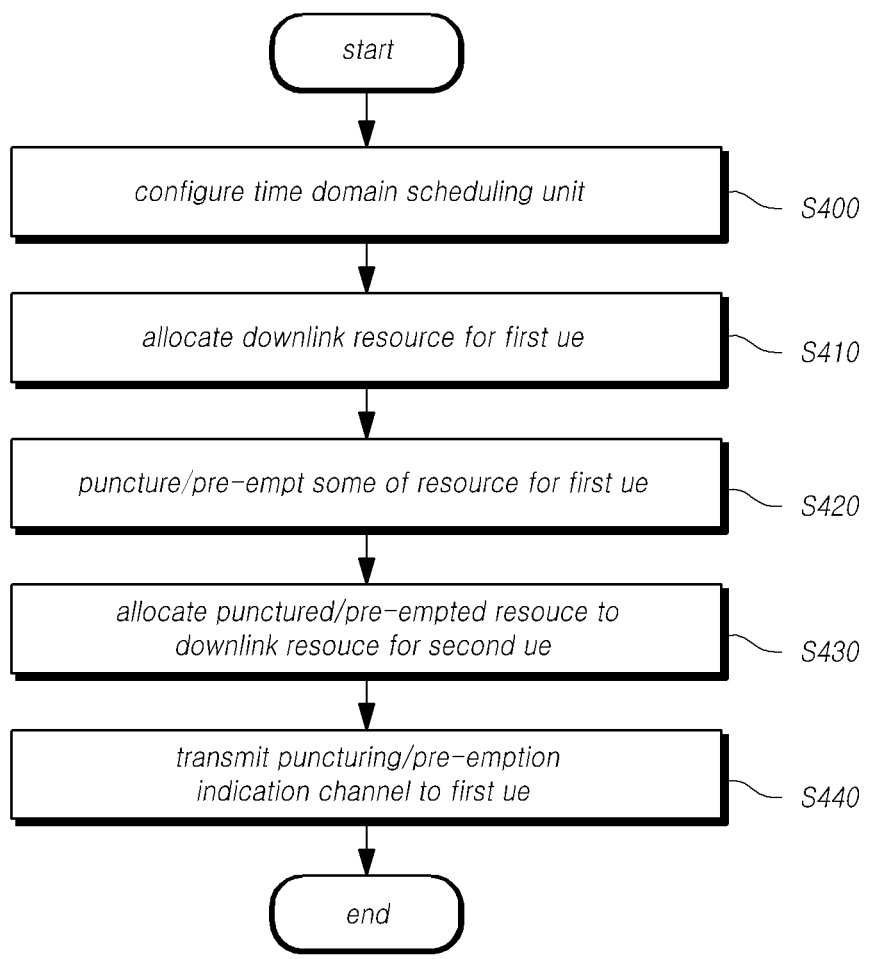
FIGS. 4 and 5 are flowcharts illustrating a method of transmitting and receiving data in a next generation radio access network according to embodiments.
Figure 5:
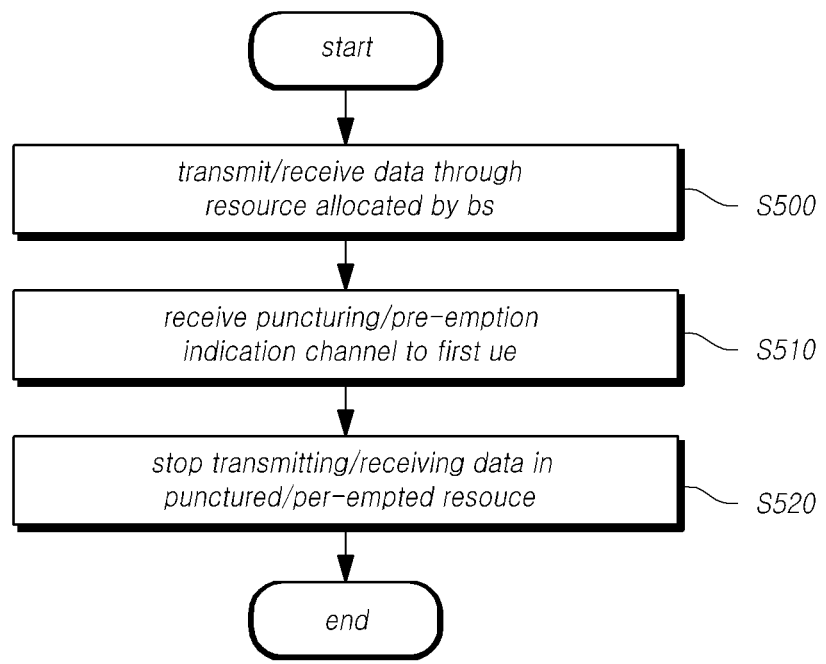

FIG. 4 and FIG. 5 are diagrams illustrating a method of transmitting and receiving data in a next generation radio access network according to the present embodiments.

FIG. 4 is diagram illustrating a method of transmitting and receiving data by a base station in a next generation radio access network in accordance with at least one embodiment.

Referring to FIG. 4, a base station configures a time domain scheduling unit suitable for a first user equipment (for example, the eMBB, the mMTC) requiring a long time domain resource allocation at S400 and allocates a downlink resource for the first user equipment according to the configured time domain scheduling unit at S410.

The base station punctures or pre-empt k OFDM symbol (s) for a second user equipment among Q OFDM symbols allocated for the first user equipment at S420.

Here, the second user equipment may be a user equipment (e.g., URLLC) suitable for the time domain scheduling unit different from that of the first user equipment.

The base station allocates the punctured/pre-empted resource to a resource for the second user equipment at S430 and transmits information on the punctured/pre-empted resource through a puncturing indication channel/pre-emption indication signal to the first user equipment at S440.

The base station may transmit the puncturing indication channel/pre-emption indication signal through dynamic signaling to the first user equipment. The base station may transmit the puncturing indication channel/pre-emption indication signal within the time domain scheduling unit allocated for the first user equipment.

The base station may configure a symbol to transmit the puncturing indication channel/pre-emption indication signal adjacent to the punctured/pre-empted symbol. The base station may additionally define a gap between the symbol to transmit the puncturing indication channel/pre-emption indication signal and the punctured/pre-empted symbol.

The base station may puncture/pre-empt a part of the resource in the resource allocation structure for the user equipment suitable for the long time domain scheduling unit, such as the first user equipment, to dynamically allocate the resource for the second user equipment in the time domain scheduling unit for the first user equipment.

Therefore, the base station may effectively allocate the resource for the user equipment suitable for the different time domain scheduling unit from each other and allocate the resource for the user equipment suitable for the short time domain scheduling unit in the resource allocation structure for the user equipment of the long time domain scheduling unit.

FIG. 5 is diagram illustrating a method of transmitting and receiving data by a user equipment in a next generation radio access network in according with at least one embodiment.

Referring to FIG. 5, a user equipment transmits/receives data through allocated resource by the base station at S500.

The user equipment monitors the dynamic puncturing indication channel/dynamic pre-emption indication signal which is transmitted from the base station within the time domain scheduling unit at a constant period.

When the puncturing indication channel/pre-emption indication signal is transmitted from the base station, the user equipment receives it through a symbol within the time domain scheduling unit at S510.

The user equipment checks information about the punctured/pre-empted symbol for the other user equipment within the allocated time domain scheduling unit through the puncturing indication channel/pre-emption indication signal.

The user equipment stops transmitting/receiving the data at the punctured/pre-empted resource at S520 so that the other user equipment suitable for different time domain scheduling unit from the user equipment may transmit/receive the data through the punctured/pre-empted resource.

Here, the user equipment may determine whether k consecutive OFDM symbol(s) after the symbol of receiving the puncturing indication channel/pre-emption indication signal is punctured/pre-empted. There may be a gap between the symbol to transmit the puncturing indication channel/pre-emption indication signal and the punctured/pre-empted symbol. In this case, the position/location of the punctured/pre-empted symbol may be determined in consideration of such the gap.

If the user equipment receives the puncturing indication channel/pre-emption indication signal within the time domain scheduling unit from the base station, it doesn't perform the transmission/reception of the data in the punctured/pre-empted symbol, so that the other user equipment may transmit/receive the data in the time domain scheduling unit allocated for the user equipment.

Figure 6:
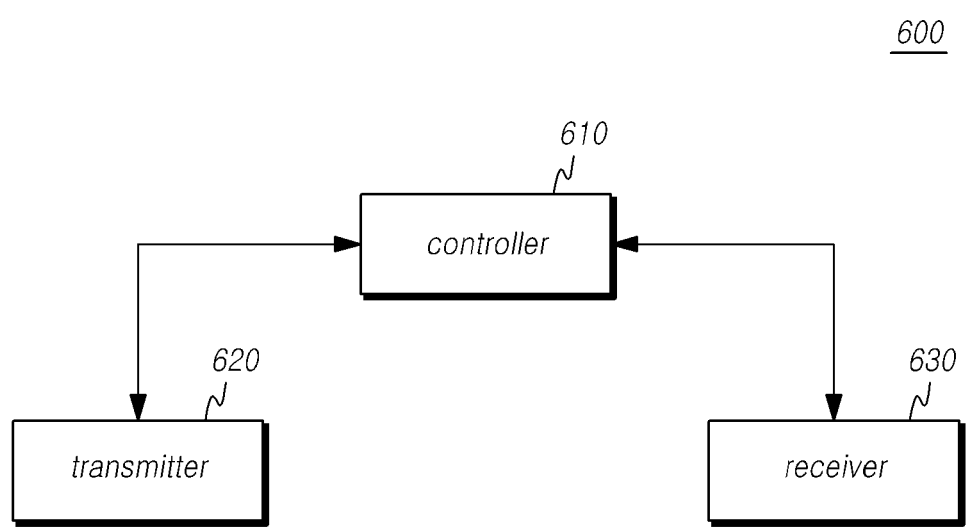
FIG. 6 is a diagram illustrating a base station according to at least one embodiment of the present disclosure.

FIG. 6 is a diagram illustrating a base station according to at least one embodiment of the present disclosure.

Referring to FIG. 6, a base station 600 according to embodiments of the present disclosure includes a controller 610, a transmitter 620, and a receiver 630.

The controller 610 is configured to control the overall operations of the base station 600 for using a part of time domain resource among symbols constituting the scheduling unit for downlink data defined for the eMBB (or mMTC) user equipment for urgent URLLC traffic transmission/reception according to the embodiments of the present disclosure described above.

The transmitter 620 and the receiver 630 are used to transmit/receive signals, messages, and data necessary for carrying out the present disclosure described above, to/from the UE.

Figure 7:
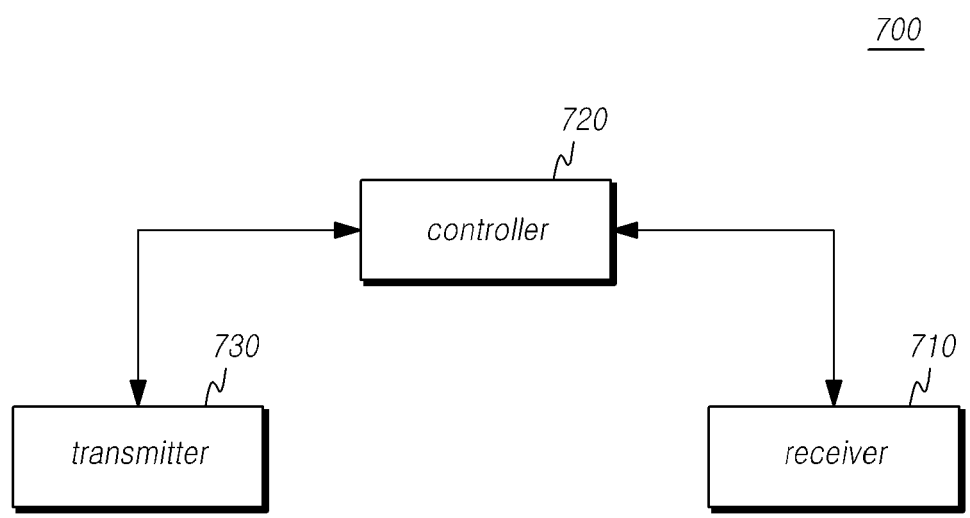
FIG. 7 is a diagram illustrating a user equipment according to at least one embodiment of the present disclosure.

FIG. 7 is a diagram illustrating a user equipment according to at least one embodiment of the present disclosure.

Referring to FIG. 7, a user equipment 700 according to embodiments of the present disclosure includes a receiver 710, a controller 720, and a transmitter 730.

The receiver 710 is configured to receive DL control information and data, messages through a corresponding channel from a BS.

The controller 720 is configured to control the overall operations of the UE 1100 for using a part of time domain resource among the symbols constituting the scheduling unit for downlink data defined for the eMBB (or mMTC) user equipment for urgent URLLC traffic transmission/reception according to the embodiments of the present disclosure described above.

The transmitter 730 is configured to transmit UL control information and data, messages to the base station through a corresponding channel.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

What is claimed is:

1. A wireless device, comprising:
    a transmitter;
    a receiver; and
    a controller which controls the transmitter and the receiver to:
        receive a radio resource control (RRC) signal including information used for monitoring an indication;
        monitor the indication, based on the information in the RRC signal;
        receive the indication that includes information on a plurality of symbols; and
        determine that there is no transmission in the plurality of symbols to a first user equipment indicated by the information in the indication,
    wherein the controller is configured to further control the transmitter and a receiver such that the RRC signal includes a timing gap that resides between at least one symbol to transmit the indication and at least one punctured/pre-empted symbol which are allocated to a second user equipment for transmission resource, the at least one punctured/pre-empted symbol having a position determined by the timing gap, and
    wherein k, which is the plurality of symbols constituting no transmission indicated by the information in the indication, is defined using a function of a subcarrier spacing for the first user equipment, and wherein k is a natural number greater than or equal to 1.

2. The wireless device of claim 1,
    wherein a value of k is determined based on the information in the RRC signal.

3. The wireless device of claim 1,
    wherein the k symbols are included in Q symbols configured for the wireless device.

4. The wireless device of claim 1,
    wherein the plurality of symbols are separated by an offset from a timing for monitoring the indication, and
    wherein the timing gap is a fixed value in consideration of a processing time of the wireless device, the fixed value being transmitted via the RRC signal or configured through cell-specific, user equipment-specific RRC signaling.

5. The wireless device of claim 1, wherein controller which controls the transmitter transmits the indication through dynamic signaling.

6. A base station, comprising:
    a transmitter;
    a receiver; and
    a controller which controls the transmitter and receiver to:
        transmit a radio resource control (RRC) signal including information used for a wireless device to monitor an indication; and
        transmit the indication that includes information on a plurality of symbols such that the wireless device determines that there is no transmission in the plurality of symbols to a first user equipment indicated by the information in the indication,
    wherein the controller is configured to further control the transmitter and the receiver such that the RRC signal includes a timing gap that resides between at least one symbol to transmit the indication and at least one punctured/pre-empted symbol which are allocated to a second user equipment for transmission resource, the at least one punctured/pre-empted symbol having a position determined by the timing gap, and
    wherein k, which is the plurality of symbols constituting no transmission indicated by the information in the indication, is defined using a function of a subcarrier spacing for the first user equipment, and wherein k is a natural number greater than or equal to 1.

7. The base station of claim 6,
    wherein a value of k is determined based on the information in the RRC signal.

8. The base station of claim 6,
wherein the k symbols are included in Q symbols configured for the wireless device.

9. The base station of claim 6,
wherein the plurality of symbols are separated by an offset from a timing for monitoring the indication, and
wherein the timing gap is a fixed value in consideration of a processing time of the wireless device, the fixed value being transmitted via the RRC signal or configured through cell-specific, user equipment-specific RRC signaling.

10. The base station of claim 6, wherein controller which controls the transmitter transmits the indication through dynamic signaling.

11. An apparatus for a wireless device, comprising:
a controller which controls a transmitter and a receiver of the wireless device to:
  receive a radio resource control (RRC) signal including information used for monitoring an indication;
  monitor the indication, based on the information in the RRC signal;
  receive the indication that includes information on a plurality of symbols; and
  determine that there is no transmission in the plurality of symbols to a first user equipment indicated by the information in the indication,
wherein the controller is configured to further control the transmitter and the receiver such that the RRC signal includes a timing gap that resides between at least one symbol to transmit the indication and at least one punctured/pre-empted symbol which are allocated to a second user equipment for transmission resource, at least one punctured/pre-empted symbol, the at least one punctured/pre-empted symbol having a position determined by the timing gap, and
wherein k, which is the plurality of symbols constituting no transmission indicated by the information in the indication, is defined using a function of a subcarrier spacing for the first user equipment, and wherein k is a natural number greater than or equal to 1.

12. The apparatus of claim 11,
wherein a value of k is determined based on the information in the RRC signal.

13. The apparatus of claim 11,
wherein the k symbols are included in Q symbols configured for the wireless device.

14. The apparatus of claim 11,
wherein the plurality of symbols are separated by an offset from a timing for monitoring the indication, and
wherein the timing gap is a fixed value in consideration of a processing time of the wireless device, the fixed value being transmitted via the RRC signal or configured through cell-specific, user equipment-specific RRC signaling.

15. The apparatus of claim 11, wherein controller which controls the transmitter transmits the indication through dynamic signaling.

\* \* \* \* \*